United States Patent Office 2,886,458
Patented May 12, 1959

2,886,458

BINDER FOR COATING SURFACING MATERIALS AND APPLICATIONS THEREOF

Marcel Ceintrey, Paris, France, assignor to Société Chimique et Routière de la Gironde, Paris, France, a French body corporate No Drawing. Application November 14, 1956
Serial No. 622,021

Claims priority, application France May 25, 1956

1 Claim. (Cl. 106—277)

The present invention relates to hydrocarbon binders for coating surfacing materials used in the construction of, for example, roads, aerodromes and ground surfaces, and more particularly to binders of the type consisting of aqueous emulsions used in the cold coating of surfacing materials.

The aqueous emulsions used heretofore are of two types: firstly, the basic emulsions containing anionic emulsifying agents and, secondly, the acid emulsions containing cationic emulsifying agents.

Among the basic emulsions used there may be cited, asphalt or fluxed asphalt emulsions used in the one-stage cold coating of surfacing materials. Basic emulsions have been used in effecting cold coating in two stages. Thus in one method, more or less moist materials are coated in the first stage, with an emulsion of water in tar (inverse emulsion), and in the second stage, with an emulsion of asphalt in water (direct emulsion).

In another method, the dry or moist materials are coated in the first stage, with an emulsion of dope or with a strongly doped very fluid binder, so as to obtain good adhesiveness, and in the second stage with ordinary fluxed asphalt or an asphalt emulsion.

In all the foregoing cases, the usual advantages of cold coating are obtained. However, all these methods give rise to a number of difficulties.

The results obtained depend on the type and condition of the material. The various above-mentioned methods are not sufficiently generally applicable to permit obtaining comparable results with the various materials encountered in practice, which range from basic calcareous materials to siliceous materials, emulsions containing anionic emulsifying agents being more suitable for basic materials.

The adherence of the binder to the aggregates is not always perfect and the stability of the material obtained depends very much on atmospheric conditions.

The emulsions containing cationic emulsifying agents, which are usually fluxed asphalt emulsions, while providing new possibilities as concerns adherence, especially in the coating of acid and moist materials, are not so suitable for basic materials and have, furthermore, the following disadvantages:

(a) The emulsion is generally very rapidly broken, which is difficult to control. Thus it is impossible to coat gravelly or dirty materials, the small elements having a tendency to accelerate the breakage.

(b) After the emulsion breaks, the basic binder hardens very rapidly, which frequently results in a tearing of the film of this binder on the surface of the coated material.

The object of the present invention is to remedy these disadvantages and to provide a binder consisting of an aqueous emulsion containing a cationic emulsifying agent permitting a cold coating, in excellent conditions, of surfacing materials of all kinds, whether they be basic, acid, clean, dirty, large or small in size.

The binder embodying the invention is characterized in that it comprises a direct aqueous cationic emulsion of a mixture of tar and asphalt consisting of 30 to 60% tar for 70 to 40% asphalt, said emulsion containing a cationic emulsifying agent. These proportions are very different from those encountered in the usual mixtures of tar and asphalt, used as such and not in the form of an emulsion, in respect of which mixtures it is well established that one cannot exceed 15 to 20% of asphalt for 85 to 80% of tar, owing to the danger of flocculation.

The tar may originate from gas-works or coking plants and its viscosity is generally between 15 and 200 seconds BRTA, 4 mm., 30° C.

It has been discovered that obtaining an emulsion by means of a suitable cationic emulsifying agent permitted using these abnormal proportions without disadvantage. Further, these proportions result in a binder which has a remarkably wide range of applications. It has indeed been found that materials of any kind, whether clean or dirty, are effectively coated with the binder of the invention, which, as mentioned above, is not possible with known binders.

The asphalt is an ordinary asphalt, for example that produced by the Raffineries Françaises (French Refineries), having a penetration between 80 and 200.

The pre-emulsion binder, obtained by mixing the tar and asphalt just mentioned which are heated to 80 to 90° C., has a viscosity between 50 and 1000 seconds BRTA, 10 mm., 25° C. (BRTA means in the present specification that the measurements are made according to the standards of the British Road Tar Association, the first number following the letters BRTA being the diameter of the flow aperture of the viscosimeter and the second number the temperature at which the measurement is effected. A description of these standards can be found, inter alia, in "Manuel du Laboratoire Routier," by M. Peltier, pages 268 and 273–276).

If desired, the viscosity of the binder may be adjusted to the most advantageous value, having regard to the outside temperature and the mixing means used, by adding a flux oil derived from the distillation of tar or asphalt, which distills between 100 and 400° C.

The pre-emulsion binder is then emulsified in water with an emulsifying agent in the proportion of about 40 to 70% by weight of pre-emulsion binder relative to the whole amount of emulsion, the stronger concentrations being preferred to reduce transportation costs.

The emulsifying agent must be chosen in accordance with the high tar content in the binder. Owing to its aromatic character, tar has dissolving qualities with respect to emulsifying agents which are much greater than those of asphalt or cut-backs. It is known that, in order to obtain a direct emulsion or an emulsion of the oil in water type, it is necessary that the emulsifying agent be soluble in water. When the emulsifying agent is dissolved to an excessive degree in the oils of the tar, it cannot fulfill its function if the residual amount dissolved in the water is too small. No emulsion, or a water in oil emulsion, is obtained. Thus the emulsifying agent must have a good coefficient of partition of its solubility in the oils of the tar, on the one hand, and in the water of the emulsion on the other.

It has been discovered that aminic emulsifying agents having the following formulae satisfy these conditions:

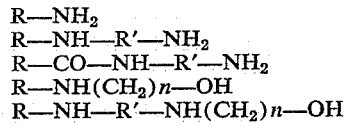

in which:

$n = 1$ to 6.

R = a hydrocarbon radical which is saturated or possesses one or several double bonds and in which the number of carbon atoms is between 10 and 20 and preferably between 10 and 16.

R' = a preferably saturated hydrocarbon radical having 1 to 4 carbon atoms.

These emulsifying agents may be used alone, or better still, mixed, so as to obtain, according to the quality and quantity of tar used, a suitable partition or distribution of the solubilities in the tar oils and in the water of the emulsion.

To obtain the emulsified binder, the emulsifying agent is, firstly, dissolved in water acidified with, for example, hydrochloric acid, so as to obtain a substantially total neutralization, a slight excess of the aminic emulsifying agent being, however, permissible and even desirable.

The tar and asphalt mixture and the aqueous solution of the emulsifying agent are each heated between 70 and 110° C. and then mixed in a homogenizer from which the final emulsion issues at a temperature of 75 to 98° C. This emulsion is then ready for use in the cold coating of surfacing materials of any kind.

A further object of the invention is to provide a method of coating surfacing materials using this binder, and to provide roads, aerodromes and ground surfaces obtained from materials thus coated.

The following examples will serve to illustrate the invention, it being understood that the scope of the latter is in no way intended to be limited thereto.

First, two examples will be given of the preparation of the pre-emulsion binder consisting of the mixture of asphalt and tar.

A. PREPARATION OF THE PRE-EMULSION BINDER (1) Gas-works tar having a viscosity:

| | Percent |
|---|---|
| BRTA, 4 mm. 30° C., 22 seconds | 32 |
| Asphalt, penetration 180/200 | 68 |

By mixing at 80-90° C. with a pump or mixer, there is obtained a mixture having a viscosity of 400 seconds BRTA, 10 mm., 25° C. which forms the pre-emulsion binder for obtaining the cationic emulsion.

(2) Coking-plant tar having a viscosity:

| | Percent |
|---|---|
| BRTA, 4 mm., 30° C., 35 seconds | 40 |
| Asphalt, penetration 180/200 | 57 |
| Light oil from tar distilling between 120° and 220° | 3 |

The pre-emulsion binder thus obtained has a viscosity of 100 seconds BRTA, 10 mm., 30° C.

B. PREPARATION OF EMULSIFIED BINDER

Either of the pre-emulsion binders just mentioned may be used in the preparation of emulsified binders, the following examples of which provide some formulae which may be used. In these examples, the proportions correspond to 1000 kg. of final emulsion.

Example 1

| | Kg. |
|---|---|
| Pre-emulsion binder | 600 to 650 |
| Amine: R—NH$_2$ (R = a hydrocarbon radical having 10 to 12 carbon atoms) | 2 |
| Amine: R—NH—(CH$_2$)$_2$—NH$_2$ (R = a hydrocarbon radical having 12 to 18 carbon atoms) | 2 |
| Hydrochloric acid, density 1.163 | 4.500 |
| Water | Balance |

Example 2

| | |
|---|---|
| Pre-emulsion binder | 600 to 650 |
| Amine: R—NH$_2$ (R = a hydrocarbon radical having 10 to 12 carbon atoms) | 4 |
| Hydrochloric acid, density 1.163 | 4.500 |
| Water | Balance |

Example 3

| | |
|---|---|
| Pre-emulsion binder | 600 to 650 |
| Amine: R—NH—(CH$_2$)$_2$—NH$_2$ (R = a hydrocarbon radical having 12 to 18 carbon atoms) | 3 |
| Hydrochloric acid, density 1.163 | 4 |
| Water | Balance |

As compared to emulsions containing cationic emulsifying agents usually prepared with fluxed asphalt, the emulsified binder of the invention is characterized by a slower breaking speed in respect of stony aggregates and by better adhesiveness. It is especially capable of coating dirty siliceous or calcareous materials and provides a film of binder which adheres perfectly to these materials.

The following example of coating shows the advantage of the binder of the invention. The material to coat and the binder are used in the following proportions:

| | Percent |
|---|---|
| Orne quartzites containing 5% argillaceous gangue | 92 |
| Cationic emulsion of asphalt/tar | 8 |

The materials are moistened with 3% water and mixed at surrounding temperature with the emulsion.

After several minutes, a coating of the surface of the aggregate with a homogeneous film of asphalt/tar is obtained; the emulsion breaks and the water exudes.

If, immediately after coating, the materials obtained are completely immersed in distilled water and are inspected at the end of 8 hours, 24 hours and 3 days, it is found that, even after the latter lapse of time, the percentage of de-coated products is less than 5%.

If, instead of the preceding emulsion, there were used an emulsion of asphalt or fluxed asphalt prepared in accordance with the following proportions:

| | Kg. |
|---|---|
| Asphalt or fluxed bitumen | 65 |
| Oleylamine neutralized with hydrochloric acid | 0.4 |
| Water: balance to make 100 kg. | | there is obtained, in carrying out the above-mentioned procedure, about 95% uncoated materials after mixing for several minutes. It is even unnecessary to place the coated products in water to observe the de-coating thereof.

Although specific examples of the invention have been given, many modifications and changes may be made therein without departing from the scope of the invention as defined in the appended claim.

Having now described my invention what I claim as new and desire to secure by Letters Patent is:

A binder for coating surfacing materials, comprising a direct aqueous emulsion of a mixture of tar and asphalt consisting of 30 to 60% tar and 70 to 40% asphalt, said mixture of tar and asphalt containing a cationic aminic emulsifying agent, which is substantially neutralized by a mineral acid, said emulsifying agent being at least one compound selected from the group consisting of amines having the following formulae:

R—NH$_2$
R—NH—R'—NH$_2$
R—CO—NH—R'—NH$_2$
R—NH—(CH$_2$)$n$—OH and
R—NH—R'—NH—(CH$_2$)$n$—OH in which
$n$ is an integer selected from 1 to 6 inclusive
R is a straight chain alkylenyl radical having 10 to 20 inclusive carbon atoms, and
R' is an alkyl radical having 1 to 4 inclusive carbon atoms.

References Cited in the file of this patent

UNITED STATES PATENTS

| | | |
|---|---|---|
| 2,189,379 | Kon et al. | Feb. 6, 1940 |
| 2,416,134 | Allen | Feb. 18, 1947 |
| 2,690,978 | Cross | Oct. 5, 1954 |
| 2,706,688 | Sommer et al. | Apr. 19, 1955 |
| 2,760,878 | Lhorty | Aug. 28, 1956 |